United States Patent Office 3,734,943
Patented May 22, 1973

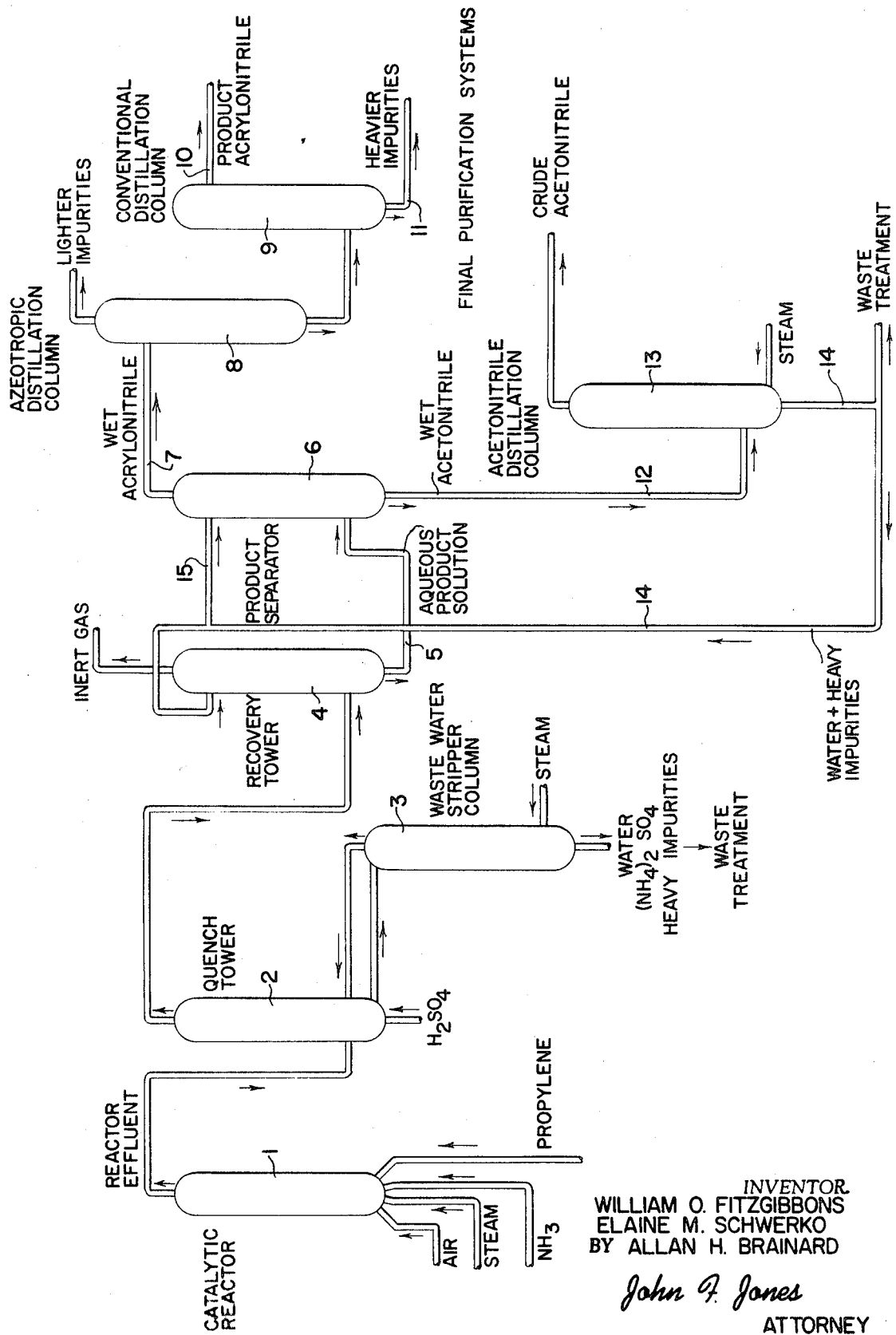

3,734,943
DEEP WELL DISPOSAL PROCESS FOR ACRYLO-
NITRILE PROCESS WASTE WATER
William O. Fitzgibbons, Hudson, Elaine M. Schwerko, Solon, and Allan H. Brainard, Bedford, Ohio, assignors to The Standard Oil Company, Cleveland, Ohio
Filed May 6, 1971, Ser. No. 140,782
Int. Cl. C07c 121/32
U.S. Cl. 260—465.3
4 Claims

ABSTRACT OF THE DISCLOSURE

A process for the deep well disposal of a waste water stream resulting from a catalytic ammoxidation process for the production of acrylonitrile comprises adding minor amounts of acrolein or a mixture of acrolein and ammonium sulfate to the waste water stream prior to pumping the stream into the well.

---

The present invention is concerned with a process for the deep well disposal of waste water from an acrylonitrile manufacturing operation, and more particularly pertains to a process applicable to a manufacturing facility for acrylonitrile by the ammoxidation of propylene wherein the waste water from the acrylonitrile recovery column is treated with a small amount of acrolein or a mixture of acrolein and ammonium sulfate, prior to pumping the waste water into a deep well in the earth for disposal.

The production of acrylonitrile by the catalytic ammoxidation of propylene is well-known to those skilled in the art. For instance, an article in Hydrocarbon Processing and Petroleum Refiner, November 1962, on pages 187–190, gives a rather comprehensive description of a process for the catalytic reaction of mixtures of propylene, optionally steam, air and ammonia to produce acrylonitrile and other by-products including acetonitrile and hydrogen cyanide. The effluent from the propylene ammoxidation reactor is scrubbed in a quench tower with water which may contain an acid such as sulfuric acid to convert ammonia to ammonium sulfate in an aqueous solution. The bottom effluent from the quench tower is fed to a waste water column where heavy impurities and ammonium sulfate are separated, and the overhead from the quench tower is fed to a product separator which provides a wet acrylonitrile overhead. The wet acrylonitrile is subsequently dried and purified by azeotropic and conventional distillation. The bottom effluent from the product separator is wet acetonitrile which is similarly separated, concentrated, dried, and converted to a high-purity product. A portion of the bottom effluent from the wet acetonitrile distillation column is removed and disposed of by pumping into a deep well after it has first been treated with a mixture of acrolein and ammonium sulfate, acrolein per se, or an aqueous solution containing these materials. Failure to treat the wet acetonitrile bottoms in this manner results in plugging of the disposal well when the material is pumped therein over a period of time.

The mechanism whereby the addition of acrolein and ammonium sulfate to the wet acetonitrile bottoms stream eliminates plugging of the deep disposal well is not known. However, plugging is believed to be caused by suspended particles in the waste stream in the particle size range of about 0.45 to 5.0μ which cause a decrease in the permeability of the rock core and a corresponding increase in the injection pressure at the well. It is preferred, and plugging of the well is virtually eliminated, when the wet acetonitrile bottoms stream is filtered through sand after it is treated with the acrolein or the acrolein-ammonium sulfate mixture.

A general process scheme of the acrylonitrile process from which the wet acetonitrile bottoms stream is derived is shown in the accompanying drawing. In this process approximately stoichiometric quantities of propylene, ammonia and oxygen (as air) are introduced via spargers and are reacted at elevated temperatures and essentially atmospheric pressures in catalytic reactor 1. The effluent from the reactor is introduced into a quench tower 2 where the unreacted ammonia in the reactor effluent is neutralized with sulfuric acid and the resulting ammonium sulfate, water and heavy impurities are separated from the stream in the waste water stripper column 3. The overhead from the quench tower is taken to a recovery tower 4 where it is scrubbed with water in order to remove soluble organic products as an aqueous solution. The aqueous solution of organic products is removed from the product scrubber by means of line 5. This solution is then taken to a product separator 6 into which is also added an aqueous stream containing minor amounts of heavy impurities by means of line 15. This column provides a wet acrylonitrile overhead 7 and a wet acetonitrile bottom stream 12. The wet acrylonitrile overhead is dried and purified by azeotropic distillation in column 8, and conventional distillation in column 9. The overhead 10 from distillation column 9 consists of product acrylonitrile, and the residue removed through line 11 comprises a mixture of small amounts of by-products and heavier impurities. The wet acetonitrile is transferred from the product separator 6 via line 12 to the acetonitrile distillation column 13. The bottom stream 14 from the acetonitrile distillation column is divided and a portion of the stream is recycled to the product separator 6 and the remainder is treated and disposed of according to the process of this invention. The overhead acetonitrile from the acetonitrile distillation column 13 is further concentrated and dried.

The wet acetonitrile bottoms stream 14, obtained from the acetonitrile distillation column 13 contains various by-products and heavy organic material resulting from the ammoxidation reaction. These products have been characterized as polynitriles, partially hydrolyzed polynitriles and cyanoethylated products of ammonia which in turn react with other constituents to form polymers, and polymers of hydrogen cyanide, unsaturated aldehydes, ketones, cyanohydrins, and the like. Chemical analysis of a typical wet acetonitrile bottom stream indicates the following composition:

TABLE I

| | Percent concentration |
|---|---|
| Water | 98.2 |
| Ammonium sulfate | 0.02 |
| Heavy organic material | 1.74 |

In the treatment of the aqueous stream of wet acetonitrile bottoms a synergistic effect on flow rate of the waste water into the disposal well is observed for a mixture of acrolein and ammonium sulfate. However, satisfactory flow rates can also be maintained by treating the waste water stream with small amounts of acrolein per se. Conveniently some waste streams from the acrylonitrile process, as for example, the bottom stream from the waste water column 3 contain sufficient amounts of acrolein and ammonium sulfate, which are present as a reaction product of acrolein and ammonium sulfate, so that when this stream is mixed with the waste stream from the acetonitrile distillation column, no plugging is observed in the well as evidenced by the lack of increase in injection pressure. Ammonium sulfate by itself however has litle effect on the injectability when added to the wet acetonitrile bottoms waste stream.

The elimination of plugging with acrolein and mixtures of acrolein and ammonium sulfate is quite specific for these materials, since analogous aldehydes such as propionaldehyde and methacrolein have little or no effect on reducing plugging.

The concentration of acrolein and ammonium sulfate required to minimize or eliminate plugging and to obtain satisfactory flow rates in the disposal well are within the range of from about 0.05 up to about 2.0 percent by weight of acrolein, and from about 0 to 15 percent by weight of ammonium sulfate, based on the weight of the waste water stream. Preferred concentrations are in the range of from about 0.1 to 1.0 percent by weight of acrolein and from about 0.25 to 10 percent by weight of ammonium sulfate based on the weight of the waste water stream, while optimum results are obtained with equal weight concentrations of approximately 0.5 weight percent of each component.

The bottom stream from the waste water column 3 as herein before indicated contains sufficient amounts of by-product acrolein and ammonium sulfate so that it can be advantageously combined with the waste stream from the wet acetonitrile distillation column to eliminate plugging. The composition of a typical waste water column stream is shown in Table II:

TABLE II

| | Percent concentration |
|---|---|
| Water | 85.5 |
| Ammonium sulfate | 8.1 |
| Acrolein-$(NH_4)_2SO_4$ reaction product | 0.4 |
| Heavy organic material | 6.1 |
| Acrylonitrile | 0.02 |
| Acetonitrile | 0.01 |
| Maleonitrile | 0.20 |
| Fumaronitrile | 0.08 |

Satisfactory flow rates are obtained on combining these streams in a ratio of about 0.2 to 1.8 volumes of the waste water column stream per volume of the bottom stream from the acetonitrile distillation column. However the ratio is not necessarily limited to this range and may vary in accordance with the concentration of acrolein and ammonium sulfate occurring in the waste water column effluent.

In the evaluation of this process a laboratory test procedure was employed to determine the plugging potential of the wet acetonitrile waste water stream. A device known as a Silting Index Apparatus manufactured by Millipore Filter Corp., Bedford Mass., was used. The apparatus permitted the filtration of a contaminated liquid sample through a known filter area at a uniform high pressure so that the flow decay due to filter clogging was recorded as a function of time.

In the experiments shown in Tables III, IV, V and VI, the silting indices were measured in an apparatus comprising a 10 cc. syringe fitted with a plunger at the top of the syringe, a 0.8µ size Millipore® filter (AAWP 013 SI) positioned at the bottom of the syringe and a #3 silting head. A weight exerting a uniform force of 50 p.s.i. was applied to the plunger, and the time required for the plunger to travel from the zero position at the top of the syringe to various lower level positions was recorded, and the silting index calculated. These results were confirmed by a core plug test which consisted of measuring the drop in permeability of Mt. Simon or Berea sandstone core plugs on filtering waste water sample therethrough.

The data in Table III illustrate the improvement obtained in the silting index by adding varying amounts of acrolein to the wet acetonitrile distillation column bottoms. In these tests the lower the silting index the lesser the chances of well plugging.

Table IV shows that there is little advantage in adding ammonium sulfate alone to waste water samples while the data on Table V show the marked improvement obtained in the silting index by adding a combination of acrolein and ammonium sulfate to the waste water sample. Table VI illustrates the beneficial effect obtained by treating the acetonitrile distillation column effluent with the bottom effluent from the waste water column.

TABLE III

Effect of Acrolein on Silting Index of Acetonitrile Distillation Column Bottoms

| Example | Wt. percent acrolein added | Silting index |
|---|---|---|
| 1 | 0 | 30.9 |
| 2 | 0.05 | 20.6 |
| 3 | 0.1 | 19.1 |
| 4 | 0.5 | 12.2 |
| 5 | 1.0 | 7.1 |

TABLE IV

Effect of $(NH_4)_2SO_4$ on Silting Index of Acetonitrile Distillation Column Bottoms

| Example | Wt. percent $(NH_4)_2SO_4$ added | Silting index |
|---|---|---|
| 6 | 0 | 30.9 |
| 7 | 0.5 | 19.6 |
| 8 | 5.0 | 15.2 |
| 9 | 25.0 | 19.8 |

TABLE V

Effect of $(NH_4)_2SO_4$ on Silting Index of Acetonitrile Distillation Column Bottoms Containing 0.5 wt. percent Acrolein

| Example | Wt. percent $(NH_4)_2SO_4$ added | Silting index |
|---|---|---|
| 10 | 0 | 12.2 |
| 11 | 0.5 | 1.7 |
| 12 | 5.0 | 4.7 |
| 13 | 25.0 | 84 |

TABLE VI

Effect of Waste Water Column Effluent on the Silting Index of Acetonitrile Distillation Column Bottoms

| Example | Volume percent W.W.C.B.* | Silting index |
|---|---|---|
| 14 | 0 | 30.9 |
| 15 | 33 | 1.0–1.5 |

*Based on total volume of mixture.

We claim:
1. A process for the deep-well disposal of a waste water stream resulting from the recovery and purification of acrylonitrile produced by the vapor phase catalytic ammoxidation of propylene in the presence of ammonia and oxygen, said waste water stream containing heavy organic polymers and having been obtained from the distillation of wet by-product acetonitrile following the separation of by-product acetonitrile from acrylonitrile by distillation, said process comprising adding to said waste water stream from about 0.05 to 2.0 percent by weight of acrolein prior to pumping said waste water stream into the deep-well.

2. The process of claim 1 wherein there is also added to the waste water stream from about 0.25 to 10 percent by weight of ammonium sulfate prior to pumping said waste water stream into the deep-well.

3. The process in claim 2 wherein the acrolein and ammonium sulfate are present in another waste stream produced in the recovery and purification of acrylonitrile, and said waste stream is mixed with the waste water stream resulting from the distillation of wet-acetonitrile in the ratio of from about 0.2 to 0.8 volumes per volume of the waste water stream being pumped into the deep-well.

4. The process in claim 1 wherein the waste water stream treated with acrolein is subsequently filtered through sand prior to pumping said stream into the deepwell.

References Cited

UNITED STATES PATENTS

| | | | |
|---|---|---|---|
| 3,328,266 | 6/1967 | Modiano et al. | 260—465.3 X |
| 3,352,764 | 11/1967 | Tyler | 260—465.3 X |
| 3,462,477 | 8/1969 | Caporali et al. | 260—465.3 |
| 3,433,822 | 3/1969 | Hausweiler et al. | 260—465.3 |

JOSEPH P. BRUST, Primary Examiner

U.S. Cl. X.R.

210—59; 260—465.8 R, 465.9